(12) United States Patent
Nasrallah et al.

(10) Patent No.: US 11,168,014 B2
(45) Date of Patent: Nov. 9, 2021

(54) SYSTEM AND METHOD OF FABRICATION OF ARSENIC GLASS

(71) Applicant: DUNDEE SUSTAINABLE TECHNOLOGIES INC., Montreal (CA)

(72) Inventors: Khalil Nasrallah, Thetford Mines (CA); Romain Barbaroux, St-Joseph de Coleraine (CA); Jean-Marc Lalancette, Sherbrooke (CA); David Lemieux, Thetford Mines (CA)

(73) Assignee: DUNDEE SUSTAINABLE TECHNOLOGIES INC.

( * ) Notice: Subject to any disclaimer, the term of this patent is extended or adjusted under 35 U.S.C. 154(b) by 404 days.

(21) Appl. No.: 15/966,462

(22) Filed: Apr. 30, 2018

(65) Prior Publication Data

US 2019/0330092 A1 Oct. 31, 2019

(51) Int. Cl.
| | |
|---|---|
| C03B 5/00 | (2006.01) |
| C03B 1/02 | (2006.01) |
| C03B 3/02 | (2006.01) |
| C03B 5/235 | (2006.01) |
| C03C 3/062 | (2006.01) |

(52) U.S. Cl.
CPC .......... *C03B 5/005* (2013.01); *C03B 1/02* (2013.01); *C03B 3/023* (2013.01); *C03B 5/235* (2013.01); *C03C 3/062* (2013.01)

(58) Field of Classification Search
CPC .... C03B 1/02; C03B 5/14; C03B 5/04; C03B 5/05; C03B 5/06; C03B 5/08
See application file for complete search history.

(56) References Cited

U.S. PATENT DOCUMENTS

| | | | | |
|---|---|---|---|---|
| 1,042,825 A | * | 10/1912 | Rockwell | C03B 5/06 432/74 |
| 1,476,432 A | * | 12/1923 | Troutman | C03B 5/06 432/155 |
| 2,358,903 A | * | 9/1944 | Zotos | C03B 5/14 432/20 |
| 3,037,323 A | * | 6/1962 | Gregorius | C03B 5/237 65/253 |
| 3,807,944 A | * | 4/1974 | Kranjcich | C03B 5/05 432/247 |

(Continued)

FOREIGN PATENT DOCUMENTS

| | | | | |
|---|---|---|---|---|
| CA | 2757587 A1 | | 5/2012 | |
| CA | 2824091 A1 | * | 4/2014 | ............ C03C 3/087 |

(Continued)

OTHER PUBLICATIONS

Dundee Technologies, "Arsenic Stabilisation", Sep. 15, 2017, http://dundeetechnologies.com/arsenic-stabilisation.

(Continued)

*Primary Examiner* — Jason L Lazorcik
(74) *Attorney, Agent, or Firm* — Lavery, De Billy, LLP; Gwendoline Bruneau

(57) ABSTRACT

A method of fabrication of arsenic glass, comprising forming pellets of an arsenic-containing glass-forming mixture comprising arsenic in a range between about 30 and about 50% w/w and glass forming elements, and melting the pellets by direct heating to a temperature in a range between about 950 and about 1250° C.

13 Claims, 2 Drawing Sheets

(56) References Cited

U.S. PATENT DOCUMENTS

| | | | | |
|---|---|---|---|---|
| 4,031,175 | A | * | 6/1977 | Cooper .................... C03B 1/02 264/40.7 |
| 4,094,667 | A | * | 6/1978 | Jaquay .................... C22B 9/05 75/707 |
| 4,349,366 | A | * | 9/1982 | Saeman .................... B01J 2/12 264/113 |
| 4,455,762 | A | * | 6/1984 | Saeman .................... B01J 2/12 222/276 |
| 4,641,319 | A | * | 2/1987 | Nagai .................... B22D 39/04 164/453 |
| 4,977,837 | A | * | 12/1990 | Roos .................... B09B 3/005 110/165 A |
| 5,477,790 | A | * | 12/1995 | Foldyna .................. C03B 5/005 110/211 |
| 5,857,420 | A | * | 1/1999 | Nishiyama ............. C03B 5/005 110/165 R |
| 8,998,790 | B2 | | 4/2015 | Lalancette et al. |
| 9,849,438 | B2 | | 12/2017 | Nasrallah et al. |
| 2011/0144408 | A1 | * | 6/2011 | Gruber .................... C03B 5/005 588/15 |
| 2013/0044784 | A1 | * | 2/2013 | Deckers .................. C03B 5/005 373/18 |
| 2016/0375423 | A1 | * | 12/2016 | Nasrallah .................. C03C 3/07 501/68 |

FOREIGN PATENT DOCUMENTS

| | | | |
|---|---|---|---|
| GB | 1331673 | 9/1973 | |
| WO | 2016205925 A1 | 12/2016 | |
| WO | WO-2017110877 A1 * | 6/2017 | ............... C22B 3/22 |

OTHER PUBLICATIONS

International Search Report and Written Opinion issued by the Canadian Intellectual Property Office dated Jan. 10, 2019.
International Search Report for PCT/CA2016/050390; dated May 9, 2016.
6-EPA; Arsenic Treatment Technologies for Soil, Waste, and Water; 10pgs.
EPA Method 1311; Toxicity Characteristic Leaching Procedure; SW-846: Test Methods for Evaluating Solid Waste—Physical/Chemical Methods, Washington, D.C., 1992, 35pgs.

* cited by examiner

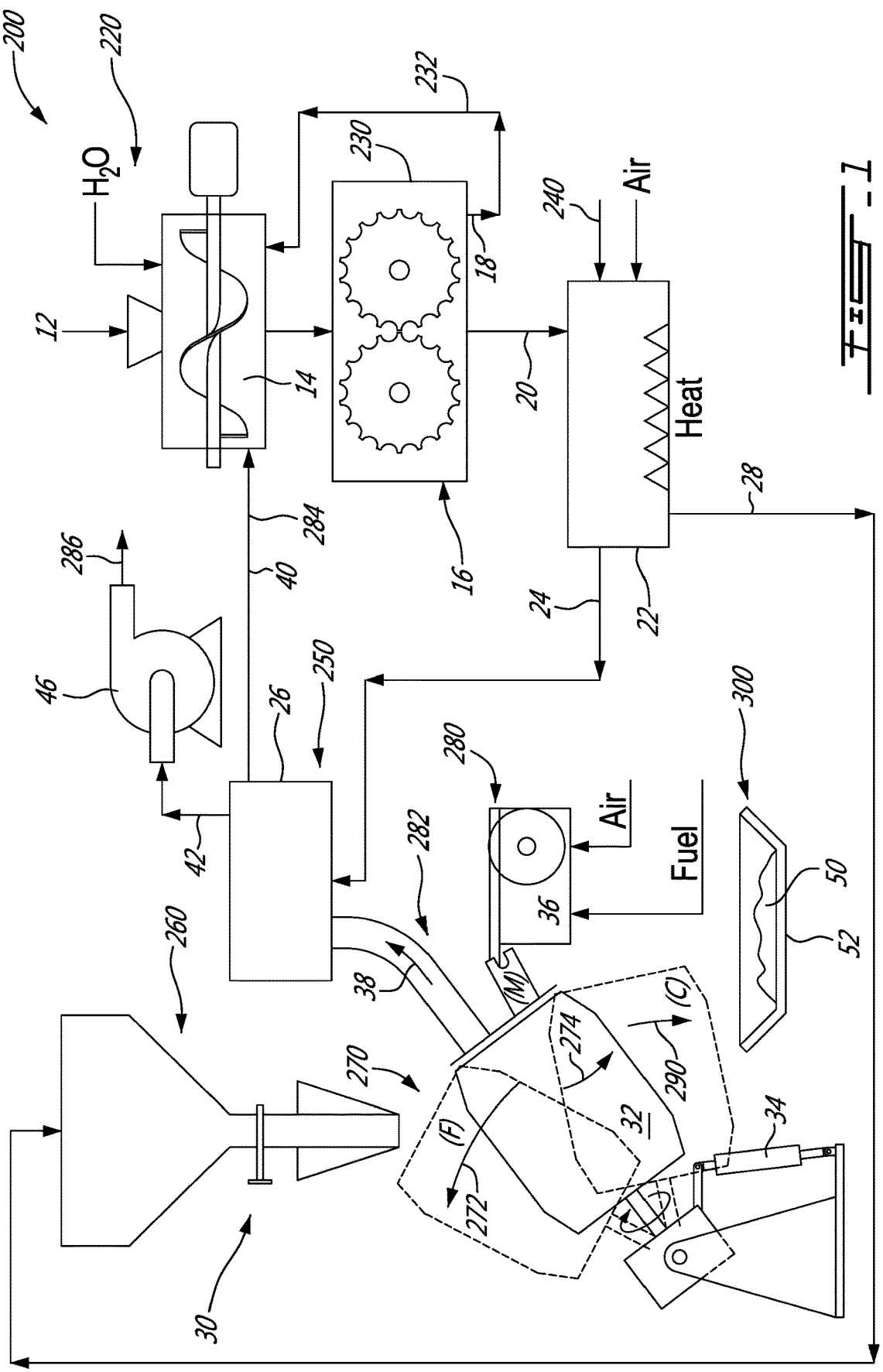

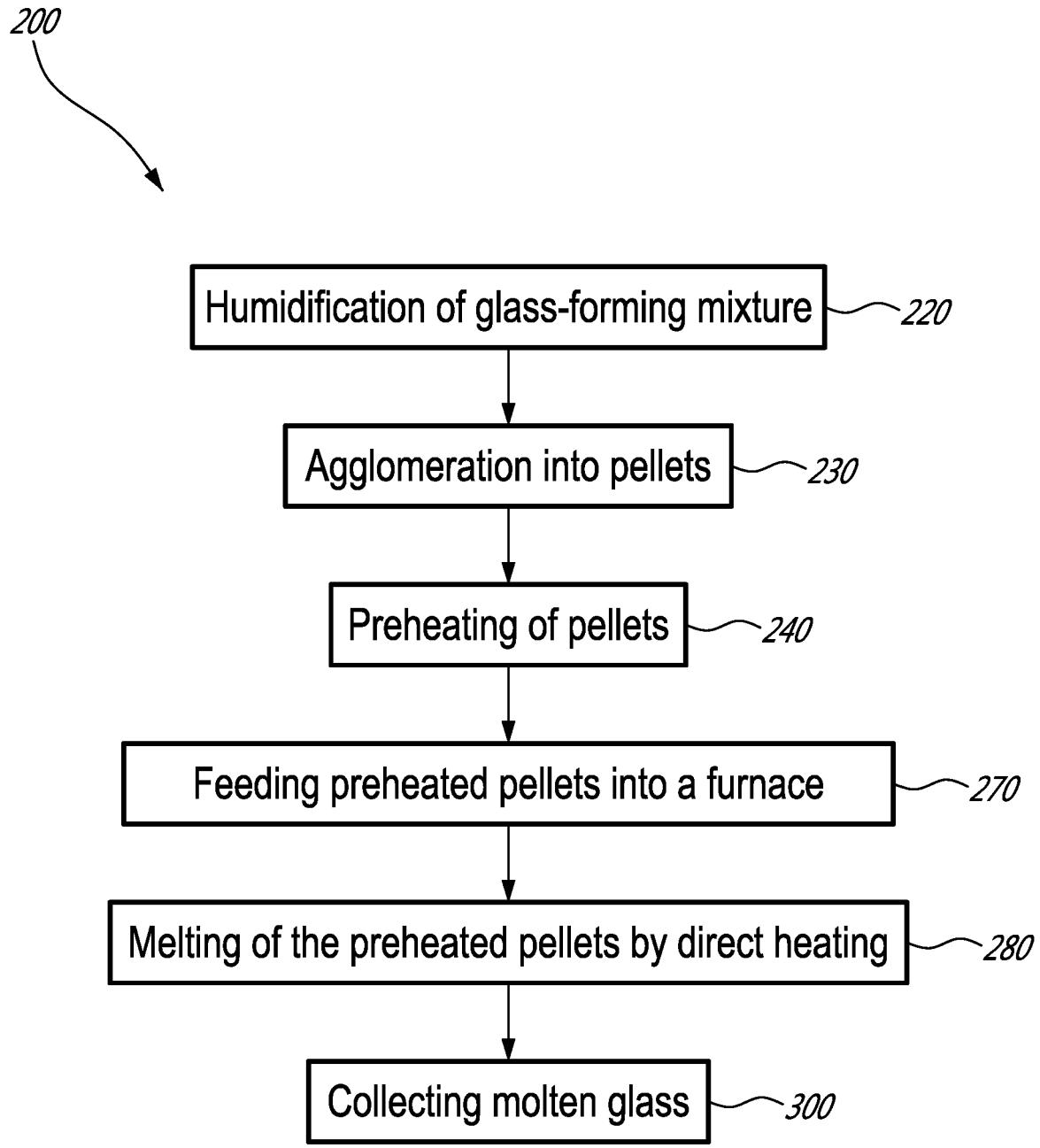

SYSTEM AND METHOD OF FABRICATION OF ARSENIC GLASS

FIELD OF THE INVENTION

The present disclosure relates to a glass incorporating arsenic. More specifically, the present disclosure is concerned with a method of fabrication thereof.

BACKGROUND OF THE INVENTION

Methods for incorporation of arsenic in a glass phase in view of sequestrating arsenic have been reported (U.S. Pat. Nos. 8,990,790 and 9,849,438). Essentially these methods called for the fusion of a homogeneous mixture of a stabilized form of arsenic with a source of silica and alkaline oxides ($Na_2O$, CaO, MgO). Thermal stabilization of arsenic was achieved by formation of calcium salt of arsenic or by insertion with an oxide such as hematite. Various sources of silica and alkalis can be used such as fayalite, feldspath or recycled glass. The origins of the arsenic can be pure arsenious or arsenic oxides, flue dusts tainted with antimony, cadmium or lead, beside arsenic combined with iron. The fusion was achieved at atmospheric pressure and at a temperature in the range between 950 and 1250° C.

These methods performed at laboratory scale have shown the potential of this approach to the sequestration of arsenic. Industrial implementation still needs to tackle problems such as the high volatility and the very high toxicity of the arsenic oxides. Moreover, for thermal efficiency, an industrial process has to be operated with a furnace constantly kept at the melting temperature of the mixture. The feeding being done in a hot crucible, dust control may also be an issue. The nature of the heating approach, either direct or indirect, may have a major impact on the energy efficiency as well as on the volatilization of the arsenic during the melting operation.

Therefore, the small-scale batch operations that have established the basis of the method left unsolved a number of parameters to be defined in order to allow operation at an industrial scale.

There is still a need in the art for a system and a method of fabrication of arsenic glass.

The present description refers to a number of documents, the content of which is herein incorporated by reference in their entirety.

SUMMARY OF THE INVENTION

More specifically, in accordance with the present disclosure, there is provided a method of fabrication of arsenic glass, comprising forming pellets of an arsenic-containing glass-forming mixture, and melting the pellets in a direct heating furnace.

Other objects, advantages and features of the present disclosure will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1 is a schematized view of a system according to an embodiment of an aspect of the present disclosure; and FIG. 2 is a flowchart of a method according to an embodiment of an aspect of the present disclosure.

DESCRIPTION OF ILLUSTRATIVE EMBODIMENTS

The present disclosure is illustrated in further details by the following non-limiting examples.

In a first experiment, a gas-fire furnace with a capacity of 50 Kg of an arsenic-containing glass-forming mixture was used for indirect heating. The fusion was done at 1200° C. by heating an alumina crucible containing the glass mixture. It required 3½ hours to reach the fusion temperature of 1200° C. The resulting glass met the EPA requirement of less than 5 mg As/L in leachate of the solid resulting from EPA 1311 procedure (EPA METHOD 1311, Toxicity Characteristic Leaching Procedure, SW-846: Test Methods for Evaluating Solid Waste—Physical/Chemical Methods. Washington, D.C., 1992). However, the energy consumption was extremely high, at 200 MBTU per ton of glass. The volatilization of arsenic was 17 w/w %, for a glass containing 20 w/w %, of arsenic at 1200° C., in part due to the long heating period to reach fusion.

In a second experiment, a rotary furnace having a 25 Kg capacity was used for direct heating, using a burner directed on the rotating charge of the arsenic-containing glass-forming mixture. The fusion of the arsenic-containing glass-forming mixture was achieved at 1200° C. in one hour and the energy consumption reduced by a large amount, at 6.8 MBTU per ton of glass.

With indirect heating, it is easier to control the atmosphere over the charge and then it is expected to be easier to control and minimize volatilization, but the low heat transfer through walls of a large refractory crucible may cause high energy consumption. With direct heating, the flame being in direct contact with the material under fusion, the heat transfer is improved, but the important volume of gases circulating in the crucible is expected to favor volatilization.

Surprisingly, the volatilization of arsenic was similar for a glass containing 20 w/w % arsenic in both experiments described hereinabove.

Based on energy efficiency, a direct heating method was thus developed as described hereinbelow.

An issue when feeding of dust or mixture of fines particles in a hot space with important gas circulation is that the feed material escapes out of the furnace upon feeding. To overcome this problem, the charge was first pelletized, using a commercial pelletizer (Zhengzhou Equipment), yielding pellets of an oblong shape of 1½ "by ¾". Moisture at the level of 9 w/w %±1 w/w % was added to the arsenic containing glass forming mixture so as to control dust production during pelletization. The obtained pellets were then dried at 200° C. to prevent explosive fracture by steam caused by the flash heating of water in the pellets at the time of feeding to the furnace. Moreover, it was found that preheating these pellets to a temperature of about 300° C. prior to feeding allowed a faster melting in the furnace.

The dust generation when feeding the furnace was less than 3 w/w % of the charge. Gases from the furnace could be directed to a dust collection system, allowing the recycling of the particulates matters, as well recycling of volatilized arsenic to the pelletizer.

Feeding of the furnace was done after unloading 75% weight of the charge of the liquid glass formed within the furnace, to a ladle as will be described hereinbelow, as it was noted that leaving a charge of the liquid glass formed within the furnace facilitates the integration of the new charge by wetting the new charge liquid. It was thus possible to achieve the vitrification at a 50 Kg-scale of arsenic-containing glass-forming mixture and obtain a glass with arsenic content of 20 w/w % As. The cost per weight unit of vitrified arsenic is five to ten times lower than the cost of production of scorodite, which is a current approach to arsenic sequestration.

In an embodiment of an aspect of the invention as illustrated for example in FIGS. 1 and 2, the method 200 comprises feeding a glass mixture 12 and water, in a mixer 14, such as a ribbon mixer for example (step 220) for humidification at a moisture content in a range between about between 7 and about 10 w/w %, for example of 9 w/w %. The resulting humidified arsenic-containing glass-forming mixture is then directed to a pelletizer 16 for agglomeration into pellets, which is found to minimize formation of dust (step 230). Fines 18 are recycled to the mixer 14 (step 232).

The arsenic-containing glass-forming mixture 12 comprises arsenic in a range between about 10 and about 25% w/w, and glass forming elements. The arsenic may be pure arsenious or arsenic oxides, flue dusts tainted with antimony, cadmium or lead, beside arsenic combined with iron for example. The glass forming elements comprises silica and alkaline oxides such as $Na_2O$, CaO and MgO, i.e. silica in a range between about 20 and about 40% w/w, ferric oxide in a range between about 5 and about 15% w/w, sodium in a range between about 5 and about 15% w/w and calcium oxide in a range between about 1 and about 15% w/w. These oxides may be supplied by sodium carbonate, feldspar, fayalite, sand, lime or recycled glass.

Resulting wet pellets 20, i.e. with pellets of the arsenic-containing glass-forming mixture with a moisture content of 9 w/w %±1 w/w %, are dried and preheated in a dryer 22 (step 240); dusts 24 from the drying step 240 are collected in a dust collector 26 (step 250).

In step 240, the pellets 28 formed in the pelletizer 16 are dried at a temperature in the range between about 190° C. and about 210° C., for example at about 200° C., down to a moisture content of 0.5% w/w for example, and submitted to a continuous direct pre-heating at a temperature in the range between about 290° C. and 310° C., for example at about 300° C. by increasing the dehydration temperature.

Preheated pellets 28 are transferred to a dosing vessel 30 (step 260), for feeding into a furnace 32 (step 270), for a direct heating to a temperature in the range between about 950 and 1250° C.

Flue gases and dusts 38 containing amounts of volatilized arsenic representing between about 5 and about 20% w/w of the initial arsenic in the glass mixture 12 are directed to the dust collector 26 (step 282). Solids 40 are collected and recycled to the mixer 14 (step 284). Cleaned flue gases 42 may be evacuated to a chimney 46 (step 286). When the fusion is complete, i.e. when the reacting mass is entirely liquid within the furnace 32, the furnace 32 is moved to a casting position (C) (step 290) and molten glass 50 is collected in a ladle 52 (step 300). Leaving molten glass 50, in a range between about 20 and 30% w/w, for example about 25% w/w, within the furnace 32 is found to facilitate the integration of the new charge by wetting the added material (step 270).

The furnace 32 may be selected as a rotating vessel, which can be selectively rotated between feeding position (F) (step 270), melting position (M) (step 280) and casting position (C) (step 290), by means of a hydraulic unit 34 for example. As schematized with dotted lines, feeding into the furnace (step 270) is done in the feeding position (F)' of the furnace 32 (step 272). Then, the furnace 32 is positioned in the melting position (M) in front of a burner 36 (step 274) for direct heating, the burner 36 being directed on the charge within the furnace 32 for the melting step (step 280), using natural gas or light oil as combustible for example. Fusion is achieved at a temperature in the range between about 950 and 1250° C. of about 1200° C. Then the furnace 32 is rotated to the casting position (C) (step 290).

Such a furnace allows a continuous operation, the loading (position (F) of the furnace) and discharge (position (C) of the furnace) of the furnace being achieved by tilting the furnace either to have access to a feeder or to a casting mold. Moreover, the furnace 32 is equipped with a particulate and arsenic collection unit, allowing recycling of these materials (see dust collector 26, chimney 46, step 282, step 284 and step 286 for example).

This invention relates to the production of a glass incorporating significant amounts of arsenic, from about 10 to about 20% w/w, in a continuous process, with a minimal loss of arsenic either by volatilization or particles losses during the melting operation, and a low energy consumption.

The scope of the claims should not be limited by the embodiments set forth in the examples, but should be given the broadest interpretation consistent with the description as a whole.

REFERENCES

EPA METHOD 1311, Toxicity Characteristic Leaching Procedure, SW-846: Test Methods for Evaluating Solid Waste—Physical/Chemical Methods. Washington, D.C., 1992.

The invention claimed is:

1. A method of fabrication of arsenic glass, comprising i) in a mixer, mixing arsenic in a range between 10 and 25% w/w and glass forming elements into an arsenic-containing glass-forming mixture, the glass-forming elements comprising silica in a range between 20 and 40% w/w, ferric oxide in a range between 5 and 15% w/w, sodium in a range between 5 and 15% w/w and calcium oxide in a range between 1 and 15% w/w, the arsenic-containing glass-forming mixture combining arsenious oxide from the arsenic with oxides from the glass forming elements; and mixing the arsenic-containing glass-forming mixture with water, ii) directing a resulting humidified arsenic-containing glass-forming mixture to a pelletizer and pelletizing the resulting humidified arsenic-containing glass-forming mixture into wet pellets, iii) drying the wet pellets thereby stabilizing the pellets, and preheating the pellets, iv) feeding the preheated pellets into a direct heating furnace, and melting the pellets in the direct heating furnace, wherein step ii) comprises directing fines from the pelletizer to the mixer, step iii) comprises directing dusts from said drying to a dust collector, and step iv) comprises directing gases from the direct heating furnace to the pelletizer; the method comprising directing particulate matter and volatized arsenic from the gases in the dust collector to the pelletizer.

2. The method of claim 1, comprising mixing the arsenic-containing glass-forming mixture with water in an amount in a range between 7 and 10 w/w %.

3. The method of claim 1, wherein said pelletizing into pellets comprises forming pellets of a size comprised in a range between 1"½ and ¾".

4. The method of claim 1, wherein said melting is achieved by direct heating at a temperature in a range between 950 and 1250° C.

5. The method of claim 1, said pre-heating comprising heating the pellets to a temperature in a range between 290°

C. and 310° C., and said melting is achieved by direct heating to a temperature in a range between 950° C. and 1250° C.

6. The method of claim 1, comprising mixing the arsenic-containing glass-forming mixture with water in an amount in a range between 7 and 10 w/w %, said drying being performed at a temperature of 200° C., said preheating the dried pellets being performed at a temperature in a range between 290° C. and 310° C., said melting being achieved by direct heating at a temperature in a range between 950° C. and 1250° C.

7. The method of claim 1, comprising feeding the pellets to the direct heating furnace positioned in a feeding position, moving the direct heating furnace to a melting position, moving the direct heating furnace after said melting to a casting position for recovery of molten glass formed within the direct heating furnace and moving the direct heating furnace back to the feeding position in a continuous process.

8. The method of claim 1, comprising feeding the pellets to the direct heating furnace positioned in a feeding position, moving the direct heating furnace to a melting position, moving the direct heating furnace after said melting to a casting position for collecting molten glass formed within the direct heating furnace, and moving the direct heating furnace back to the feeding position in a continuous process, wherein said collecting molten glass formed within the direct heating furnace comprises collecting between 70 and 80% w/w of the molten glass formed within the direct heating furnace.

9. The method of claim 1, wherein said melting is achieved by directing a flame on the pellets in the direct heating furnace.

10. The method of claim 1, wherein a resulting glass incorporates arsenic in a range between 10 and 20% w/w.

11. The method of claim 1, wherein a resulting glass incorporates arsenic in a range between 10 and 20% w/w, the method comprising collecting volatilized arsenic representing between 5 and 20% w/w of the initial arsenic content and recycling solids from said melting.

12. The method of claim 1, wherein said direct heating comprises using one of an oil burner oil and a gas burner.

13. The method of claim 1, wherein the arsenic content in the arsenic-containing glass-forming mixture comprises at least one of: pure arsenious, arsenic oxides, and arsenic-flue dusts.

* * * * *